United States Patent [19]

Davis

[11] 4,076,281
[45] Feb. 28, 1978

[54] BELL FITTING AND SUPPORT ASSEMBLY FOR PIPE

[76] Inventor: Samuel H. Davis, 111 Forest Drive, Jericho, N.Y. 11753

[21] Appl. No.: 676,656

[22] Filed: Apr. 13, 1976

[51] Int. Cl.² ............................................. F16L 3/00
[52] U.S. Cl. ..................................... 285/64; 52/220; 285/158; 285/337; 285/363; 285/370
[58] Field of Search ............... 285/175, 337, 171, 413, 285/369, 370, 414, 363, 172, 158, 56, 288, 64, 61, 62, 63; 52/220, 221; 403/191, 189; 248/49, 65, 13, 14

[56] References Cited

U.S. PATENT DOCUMENTS

| | | | |
|---|---|---|---|
| 1,401,105 | 12/1921 | Meriwether | 285/288 |
| 1,423,309 | 7/1922 | Curtis | 285/64 |
| 2,837,750 | 6/1958 | Robinson | 285/56 X |
| 3,047,110 | 7/1962 | Saha | 403/189 |
| 3,418,009 | 12/1969 | Pollia | 285/414 X |
| 3,610,666 | 10/1971 | Tyler | 285/337 |

*Primary Examiner*—Dave W. Arola
*Attorney, Agent, or Firm*—Kenyon & Kenyon, Reilly, Carr & Chapin

[57] ABSTRACT

An internally threaded mechanical-joint bell fitting for cast iron pipe is adapted to be screwed onto an externally threaded end of a plain pipe section. The fitting has an integral bolting flange circumscribing the mouth of the bell and preferably includes a circumferential water stop flange at the smaller threaded end of the fitting. The fitting also includes mounting pads at the threaded end for attaching a free-standing support structure. The support structure consists of a pair of angle columns bolted at their upper ends to the mounting pads of the bell fitting and bolted at their lower ends to brackets that are adapted in turn to be bolted to studs preset in poured concrete footings for a tank or building wall. The bracket feet are bifurcated so that each bracket can bridge a water stop barrier set into the top surface of the wall fitting. Peripherally spaced recesses, aligned with bolt holes in the bolting flange of the bell fitting, provide clearance for heavy hex nuts threaded onto clamping bolts; so that two bell fittings can be used face-to-face to resist axial tensile forces acting on the joint, thereby eliminating the need for external thrust supports.

8 Claims, 11 Drawing Figures

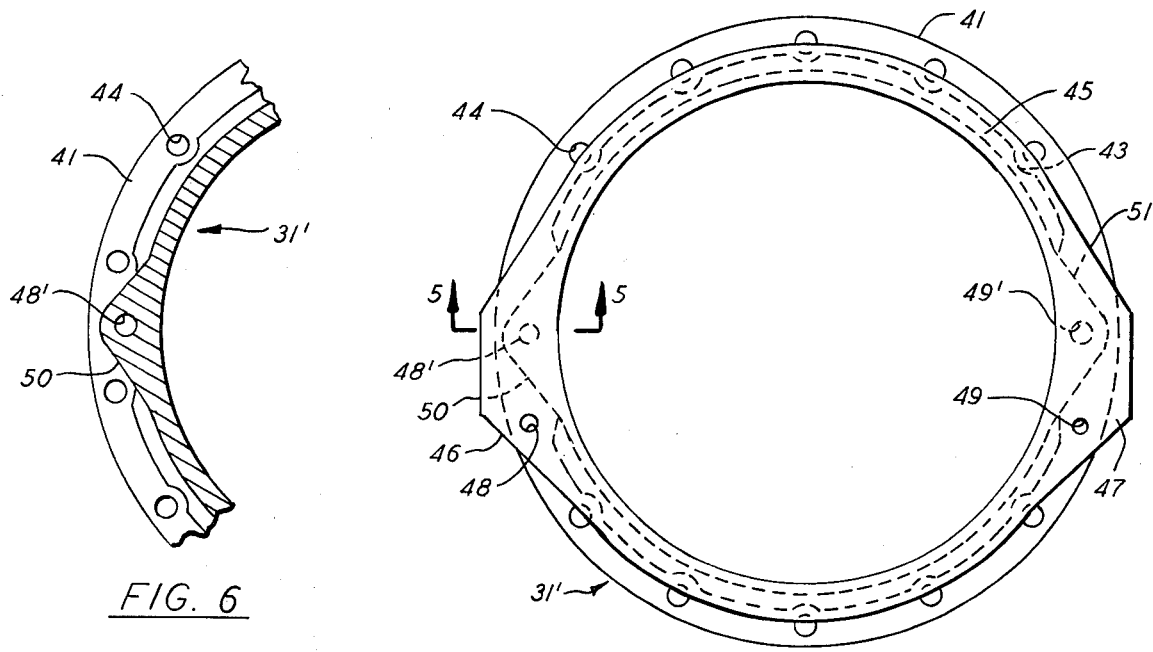
FIG. 6
FIG. 4
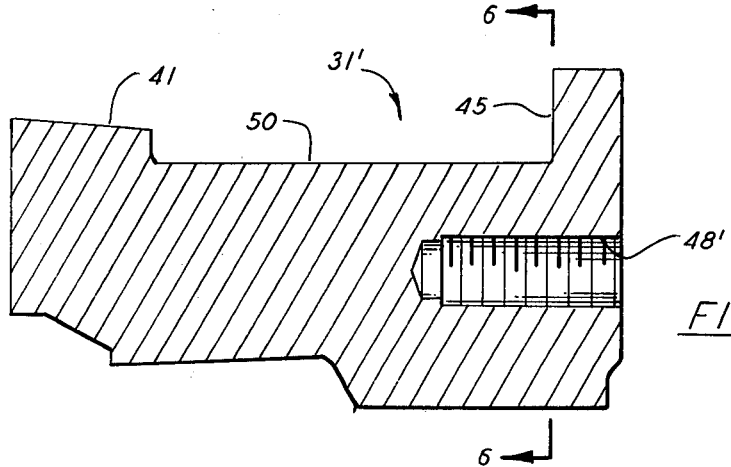
FIG. 5
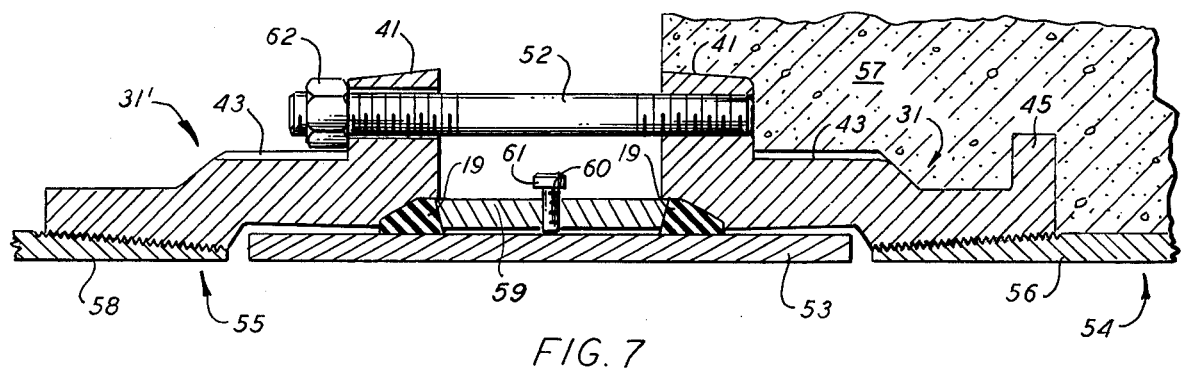
FIG. 7

BELL FITTING AND SUPPORT ASSEMBLY FOR PIPE

BACKGROUND OF THE INVENTION

1. Field of the Invention

The present invention relates to mechanical-joint connections for use with gray iron or ductile iron pipe for water and other liquids.

2. Description of the Prior Art

Gray iron and ductile iron pipes in nominal sizes ranging from 2 inches to 48 inches are extensively used in systems handling water and other liquids at pressure ratings from 150 to 350 pounds per square inch. Conventional fittings for such pipes are of three general types: mechanical-joint, bell-and-spigot, and flanged.

A mechanical joint is a gasketed type of connection for joining sections of gray iron or ductile iron pipe. It comprises three elements — a flanged bell, a rubber gasket, and a compression ring or gland. The bell is normally cast as an integral part of one end of a standard length of pipe or as an integral part of a connecting piece, sleeve, bend, tee, or other fitting having specified standard diemnsions for each nominal pipe size. The bell end of one pipe section is adapted to slip over a plain end of another pipe section of the same nominal size, after first slipping a flanged gland and a rubber gasket over the plain end. The gasket fits inside the bell and is maintained in compression by bolting the flange of the gland to the flange of the bell.

Two sections of pipe connected by means of such a mechanical bell joint are held together by the friction of the rubber gasket. The mechanical-joint type of pipe connection offers the advantage of limited flexibility to accommodate up to about 5° of angular deflection between adjacent pipes without leakage.

As mentioned above, the bell of a mechanical-joint connection is normally cast as an integral part of a full length of pipe (18 feet or 20 feet standard laying length) and normally on one end only, with the other end being left plain. In addition, there are a number of standard dimension fittings, such as bends, tees, reducers, sleeves, connecting pieces, and so forth that incorporate an integrally cast mechanical-joint bell on at least one end. The standard sleeves and connecting pieces are intended to provide transitions between different types of pipe, such as between steel pipe and cast-iron pipe or between fittings of one connector type and another connector type (e.g., mechanical-joint to bell-and-spigot or mechanical-joint to flanged). In all cases where a mechanical-joint bell end is provided on a standard pipe or fitting, however, the bell end is cast integrally with the pipe or fitting.

Most piping layouts require pipe lengths shorter than the standard laying lengths in various parts of the system, however. Particularly in piping systems involving the larger sizes of pipe, to provide a mechanical-joint bell end on lengths of pipe shorter than the standard laying lengths becomes expensive, because the cut-off portion must normally be scrapped. For example, the present cost of 36-inch cast iron pipe is approximately $55 per lineal foot. Thus, if only a short length of bell-ended pipe is needed, the value of the remainder of a 20-foot standard pipe that has been cut off may run into many hundreds of dollars.

An important application for cast iron pipe in the larger sizes is in sewage treatment and water treatment plants. Sewage treatment plants have many large concrete sludge tanks, and these tanks have a number of pipe penetrations through their walls. Pipe penetrations are also required through the walls of plant buildings. The walls of these tanks and buildings may be of varying thickness, and each pipe penetration requires a wall sleeve casting that must be properly positioned inside the forms before the concrete for the wall is poured. A typical sewage treatment plant may require over a hundred of such wall sleeves. These wall sleeves typically are special castings having a mechanical-joint bell at one or both ends and are ordered to specified lengths, depending on the wall thickness. These special castings need extra treatment at the foundry, requiring that they be ordered far in advance. Lead times may run eight months or more. Furthermore, because these wall castings are to be embedded in concrete walls, any delay in their delivery will cause delays in the schedule for pouring concrete. This can create a ripple effect resulting in costly delays affecting entire projects, because the timely pouring of concrete is basic to maintaining the orderly progress of a job.

In addition to high cost and slow delivery, conventional wall sleeve castings present a problem when setting up the forms for tank or building walls. Typically the first stage of concrete work for a tank or building is to pour footings and a floor slab. A vertical gridwork of reinforcing steel is next set up along each side of the floor slab, and then the steel is enclosed by spaced-apart forms for containing the poured concrete of the walls.

If the concrete structure is a sewage sludge separating tank, for example, a number of wall sleeves may have to be incorporated into the form at locations as much as 15 feet or so above the floor slab. These wall sleeve castings may range up to 48 inches in diameter and weight many hundreds of pounds. Since they must be supported by the wall forms, these sleeves are installed after the reinforcing steel has been placed, with the predictable result that often the reinforcing bars have preempted the space intended for the wall castings.

In addition, installing the castings and bolting them to the forms is a time-consuming task because the reinforcing steel limits access, and bolting up the second form is necessarily a blind operation. It is also a task that involves several different trades, with the usual result that many manhours are wasted in each installation.

The conventional mechanical-joint connection has another disadvantage in that it is held together only by friction between the rubber gasket and the inner pipe as a result of the pressure exerted on the gasket by the gland ring. Although special retaining glands are available which have lock screws for positive engagement with the outer surface of the plain-ended pipe, such retaining glands are not very effective. Moreover, they cost about fifty percent more than a conventional gland.

Consequently, the usual procedure is to provide heavy thrust support foundations at locations, such as elbows and tees, where the pipe joints are subjected to net axial forces tending to separate the joint. The need for such large and heavy foundation structures adds significantly to the cost of water and sewage treatment plants.

SUMMARY OF THE INVENTION

It is an object of the present invention to provide a standardized threaded bell fitting for iron pipe that is adapted to provide a mechanical-joint connection for plain pipe of any length.

Another object of the present invention is to provide a threaded mechanical-joint bell fitting having an integral water stop flange at its reduced diameter end.

It is still another object of the invention to provide a threaded mechanical-joint bell fitting having mounting means to facilitate supporting the bell fitting independently of concrete formwork.

Another object of the invention is to provide a free-standing support assembly for a wall sleeve casting.

Another object of the invention is to provide a foundation bracket for such a free standing support assembly, the bracket having a bifurcated foot to allow the bracket to bridge over a foundation water stop barrier.

Still another object of the invention is to provide a mechanical-joint assembly for pipe having axial thrust resistance equivalent to that of a bolted flanged joint.

The foregoing and other objects are achieved by providing a separate bell fitting which can be used with plain-ended iron pipe of preselected nominal diameter. The bell fitting comprises an annular member having a first smaller diameter end with a threaded inside surface adapted to fit an externally threaded pipe of said preselected standard nominal pipe diameter and with a second larger diameter end formed with a conventional mechanical-joint bell shape having an inside diameter larger than the inside diameter of said first end and an integral circumferential bolting flange around the mouth of the bell.

The smaller diameter end of the bell fitting preferably includes an integral external circumferential blank flange that is adapted to serve as a water stop. An important feature of this fitting is the provision of mounting means at the smaller end of the fitting to permit attachment of the fitting to a free-standing support structure. For smaller pipe sizes, below about 18 inches in nominal diameter, the mounting means may be formed as outward extensions of the water stop flange in which one or more rigging bolt holes are provided. For pipe sizes of 20 inches or greater, integral reinforcing pads or lugs behind the water stop flange may be needed to support the greater weight of such large fittings. These pads preferably have blind holes drilled and tapped for studs instead of through-bolts.

The mechanical-joint bell fitting of the present invention can be screwed onto a male-threaded end of a pipe of any desired length. On a given job, therefore, pieces cut off from one standard length of pipe can be used, without waste, in additional bell fitting assemblies.

The threaded mechanical-joint bell fitting can be prefabricated in all standard pipe sizes and stocked for immediate use, thereby permitting flexibility of piping system design with minimum requirements for stocked parts, minimum waste, and minimum lead time for special items such as wall sleeves.

The water stop flange on the smaller diameter end of the threaded bell fitting of this invention is particularly useful when the bell fitting is to be made up into an assembly that will be embedded in a concrete tank wall. In addition, the mounting means of the separate threaded bell fittings, in conjunction with a free standing support structure of the invention, greatly simplifies the formwork connected with the pouring of such a concrete wall. The support structure comprises a pair of angle columns of appropriate length, depending on the intended height of the fitting above the foundation slab. The columns are adapted to be bolted at their upper ends to the mounting means of the bell fitting and at their lower ends to brackets that are adapted in turn to be bolted to studs preset in the concrete foundation. The brackets are of special design with bifurcated feet so that each bracket can bridge a water stop barrier set into the top surface of the foundation slab.

Another feature of the bell fitting of the present invention is the provision or peripherally spaced recesses, aligned with bolt holes in the bolting flange at the bell end of the fitting, that provide clearance for heavy hex nuts threaded onto the clamping bolts that are normally used with conventional flanged glands. This feature allows two bell fittings to be used face-to-face in combination with a short pipe ring and a plain unflanged gland ring to provide a pipe joint having the angular flexibility of a conventional mechanical joint combined with the resistance to axial tensile forces of a conventional bolted flange joint.

The above described and other features will be explained in more detail in the following description of the preferred embodiment in conjunction with the attached drawings.

BRIEF DESCRIPTION OF THE DRAWINGS

FIG. 4 is a view of the smaller diameter end of an alternate embodiment of a mechanical-joint bell fitting for larger pipe sizes than the embodiment of FIG. 2.

FIG. 5 is a section view of the mechanical-joint bell fitting of FIG. 4, taken along line 5—5.

FIG. 6 is a section view, with the water stop flange cut away, illustrating an integral mounting lug behind the water stop flange.

FIG. 7 is a side section view of a pipe joint assembly including two mechanical-joint bell fittings face-to-face, in combination with a plain pipe spacer and a plain unflanged gland ring.

DESCRIPTION OF THE PREFERRED EMBODIMENT

Figure 1:
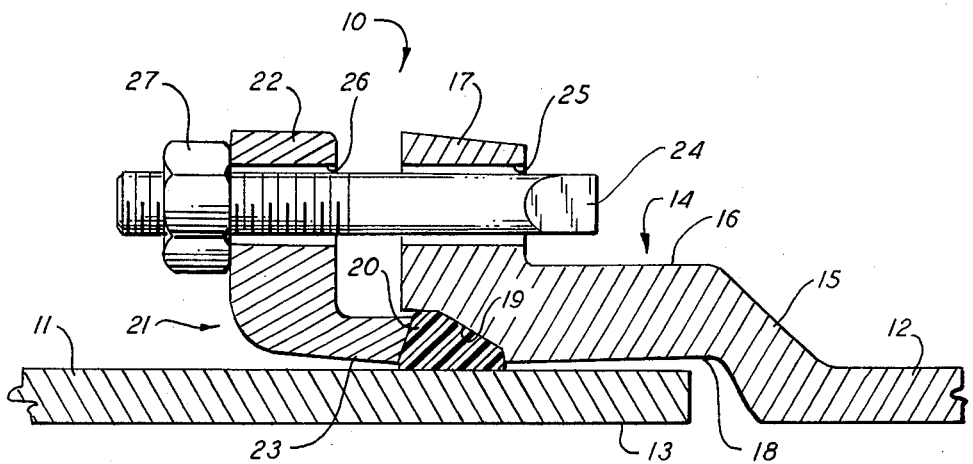
FIG. 1 is a section view of a conventional mechanical-joint connection between two standard iron pipes.

Referring first to FIG. 1, a conventional mechanical-joint connection 10 between two pipes 11 and 12 is assembled by inserting a plain end 13 of pipe 11 into a mating bell 14 that is integrally cast on the end of pipe 12. Bell 14 comprises a flared step portion 15, joined at its smaller end to the wall of pipe 12, and a substantially cylindrical portion 16 extending from the larger end of step portion 15 and terminating at a circumferential bolting flange 17.

The internal and external diameters of pipe 11 are the same as those of pipe 12, and the internal diameter of cylindrical portion 16 is sufficiently larger than the external diameter of pipe 11 to provide an easy fit. As shown, the internal surface 18 of cylindrical portion 16 has a slight inward flare to allow for a certain amount of angular misalignment (approximately 2° to 5°) between pipes 11 and 12.

At the outer end of bell 14 there is a tapered counterbore 19 for receiving a rubber gasket 20. The gasket is compressed against the wall of counterbore 19 by a gland or compression ring 21, which is shaped in the form of a circumferential flange 22 having an inner axially extending annular lip 23. Lip 23 is pressed against gasket 20 by means of a plurality of angularly spaced bolts 24 inserted through matching bolt holes 25 and 26 in flanges 17 and 22, respectively. Gland 22 is drawn up on bolts 24 by means of nuts 27, thereby sealingly squeezing rubber gasket 20 into tapered counterbore 19.

It will be appreciated that the conventional mechanical-joint connection shown in FIG. 1 will typically be formed between the plain end of one standard length pipe and the integrally cast bell end of a second standard length pipe. Or the same form of mechanical-joint connection may be used to join a plain end of pipe to any desired type of standard fitting, such as a tee, a bend, and so forth. The listing of all standard fittings and the specified dimensions for standard mechanical-joint connections for iron pipe sizes ranging from 2 to 48-inches nominal diameter can be found in the American National Standard for gray-iron and ductile-iron fittings ANSI A21.10 – 1971 (AWA C110 – 71) published by the American Water Works Association, 2 Park Avenue, New York, N.Y. 10016.

In many cases an assembly, such as a wall sleeve, is needed having a length that cannot be made up from any combination of standard pipe lengths and pipe fittings. In conventional practice, such wall sleeves are made up to special order as an integrally cast unit if a mechanical-joint bell end is required on one or both ends of the sleeve. It is also customary to provide a centrally located circumferential flange around the body of each wall casting to serve as a water stop when the wall casting is installed in a poured concrete tank wall. This is necessary because of the difficulty in obtaining a good seal between the outside surface of the wall casting and surrounding concrete. The central flange provides a barrier to liquid seeping from the tank interior through voids in the concrete adjacent to the exterior surface of the wall casting.

When wall castings are made up from a length of plain pipe and threaded plain flanges, it is customary to weld a cast iron ring around the periphery of the pipe at approximately its midpoint, prior to screwing the flanges onto the ends of the pipe. Welding cast iron is a difficult and time consuming process that requires welders of particular skill, thus adding to the cost and to the delay in obtaining the finished wall casting assembly.

Figure 2:
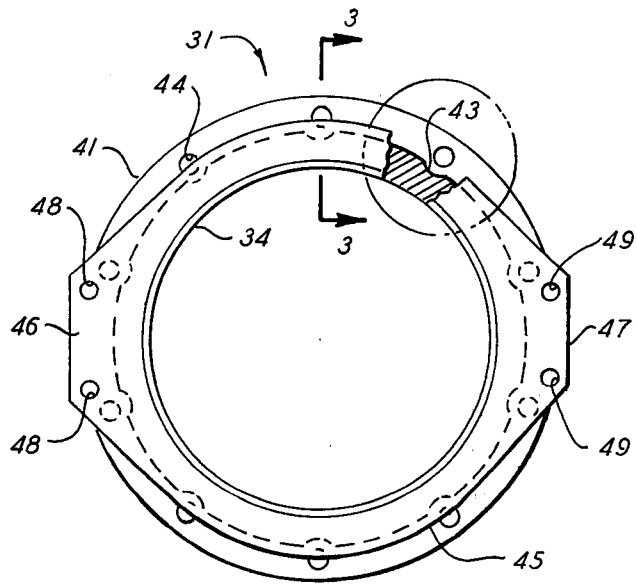
FIG. 2 is a view of the smaller diameter end of a mechanical-joint bell fitting according to the present invention.
Figure 2A:
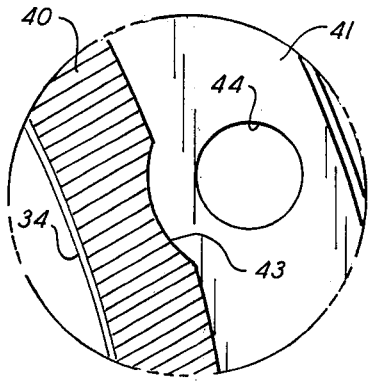
FIG. 2A is an enlarged view of a portion of the bell fitting of FIG. 2, with the water stop flange cut away, illustrating a recess in alignment with a bolt hole of the bolting flange.
Figure 3:
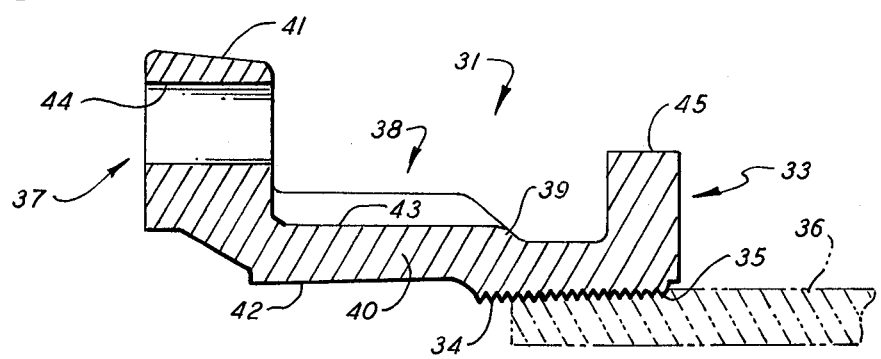
FIG. 3 is a section view of the mechanical-joint bell fitting of FIG. 2, taken along line 3—3.

These and other problems are eliminated by use of a threaded mechanical-joint bell fitting having an integral water stop. Referring to FIGS. 2, 2A and 3, one preferred embodiment of such a bell fitting 31 comprises a first end 33 having a threaded inside surface 34 adapted to fit the externally threaded portion 35 of a pipe 36, shown in dashed lines in FIG. 3. Fitting 31 has a second end 37 in the form of a bell 38 having a flared step portion 39, a substantially cylindrical portion 40 and a bolting flange 41, identical in shape and dimensions to the conventional mechanical-joint bell end 14 of FIG. 1 with one important exception.

In a standard mechanical-joint bell end all dimensions are specified for 2-inch through 48 inch sizes by the American National Standard for Gray-Iron and Ductile-Iron Fittings, ANSI A21.10. As described earlier and shown in FIG. 1, these standard bell ends have a bolting flange with spaced holes for T-headed bolts that extend through mating holes in the flange of a gland ring. Hex nuts threaded on the free end of the T-bolts are used to draw up the gland ring against the rubber gasket inside the bell.

Because of the configuration of the gland, there is ample clearance for rotating the hex nut on the free end of the T-bolt behind the gland flange. There is not enough clearance for a hex nut behind the bolting flange of a standard bell end, however. The bell fitting of the present invention provides such clearance, for reasons described more fully below, by means of recesses 43 (see particularly FIG. 2A) spaced peripherally around the external surface of the bell in alignment with the holes 44 in the bolting flange.

Another feature of bell fitting 31 is a water stop flange 45 cast integrally on the smaller diameter end of the fitting. As shown in FIG. 2, water stop 45 is a circumferential blind flange, the function of which is to obstruct the flow of any water or other liquid that may leak between the bell fitting and the surrounding concrete when the fitting is used, for example, as part of a wall sleeve assembly for a sewage treatment tank or the like.

Another important feature of bell fitting 31 is the provision of mounting means, such as mounting tabs 46 and 47 forming diametrically opposed outward extensions of water stop flange 45. Each of the mounting tabs 46 and 47 has at least one and preferably a pair of bolt holes 48 and 49, respectively, for mounting the bell fitting on suitable support means, to be described later. The advantages of providing mounting means on the smaller diameter end of the bell fitting are two-fold. First of all, this location does not interfere with any formwork that may be placed against the face of the bolting flange on the larger diameter bell end of the fitting. Secondly, this location is nearer the balance point of any wall sleeve assembly than any other location on the fitting, thereby minimizing the moment forces exerted on any support structure to which such a wall sleeve assembly may be attached.

Referring next to FIGS. 4 through 6, an alternate bell fitting embodiment 31' has a modified mounting means that incorporates integrally cast reinforcing pads or lugs 50 and 51 behind at least one of the mounting holes in each of mounting tabs 46 and 47 respectively. This alternative arrangement is particularly suitable for the larger, and consequently heavier, sizes of bell fittings where the water stop flange may not be thick enough to carry the imposed load. Because these pads provide increased metal depth, they can be drilled and tapped, as shown by hole 46' in FIG. 5, to accept mounting studs in place of the through bolts that are used with the unreinforced mounting tabs.

The embodiment of FIG. 4 has only one reinforcing lug 50 or 51 for each mounting tab, but for the largest sizes (30 inches and up) it is desirable to have two lugs for each tab, one lug for each mounting hole.

FIG. 7 depicts a special joint assembly according to the present invention, in which two threaded bell fittings 31 and 31' are mounted face-to-face to provide a mechanically secured joint in which the axial forces tending to separate the joint are carried by flange studs 52 instead of being resisted merely by the friction between rubber gaskets 19 and the surface of pipe ring 53.

The joint assembly of FIG. 7 is made between one end of a wall sleeve assembly 54 and the adjacent end of a pipe assembly 55. The wall sleeve assembly includes bell fitting 31 and a length of externally threaded plain pipe 56 encased in a concrete wall 57 of, for example, a sewage treatment tank. The pipe assembly includes bell fitting 31' and externally threaded pipe 58. Bell fitting 31' is a modified version of fitting 31 in which the water stop flange is eliminated as being unnecessary for the application. On the other hand, such a modification may still incorporate mounting means at the smaller diameter end, such as the previously described mounting tabs and reinforcing or backup lugs; so that the fitting can be supported for assembly of the joint without interfering with the bolting flange.

The remaining component of the joint assembly is a plain cylindrical gland ring 59, which may be a simple casting having internal diameter, external diameter and bevelled end dimensions as established by American National Standard ANSI A21.10 for conventional flanged glands. Because there is a clearance between the internal diameter of the gland and the external diameter of pipe section 53, the gland desirably has a radially drilled and tapped hole 60 for an adjusting screw 61.

The mechanically secured joint of FIG. 7 is assembled by first screwing studs 52 into spaced drilled and tapped holes in bolting flange 41 of the wall sleeve assembly 54. The use of studs instead of T-bolts is preferred in this application because they can be installed after the concrete has set and the forms have been removed. This leaves the face of the bolting flange unobstructed when setting up the forms; so that the forms can be fitted flush against the flange.

After studs 52 are installed, the gland ring 60 is placed on pipe section 53, and then rubber gaskets 19 are slipped over each end of the pipe section. One end of pipe section 53 is inserted into the bell end of fitting 31, and then the bell end of pipe assembly 55 is placed around the other end of the pipe section, with the holes in the bolting flange aligned with studs 52. Heavy hex nuts 62 are then threaded onto the ends of the studs.

Before the hex nuts are tightened, the gland ring should be rotated until the adjusting screw is at the top and the screw turned down until there is equal clearance between the gland and the pipe at both top and bottom. This assures that the edges of the gland will properly seat against the rubber gaskets when the hex nuts are tightened on the studs. Following this step, the adjusting screw can be backed off and removed, if desired.

Because of the simplicity of the plain gland 60, the cost of the double-bell mechanically secured joint assembly illustrated in FIG. 7 compares favorably with the cost of a single mechanical-joint assembly using a conventional flanged gland and is definitely cheaper, as well as stronger, than a mechanical-joint assembly using a special retaining gland of the type described above. Such a joint eliminates the need for heavy thrust support foundations at elbows and tees and also, because of the double bell arrangement, accommodates even greater angular misalignment between piping sections than does a single mechanical-joint assembly.

Figure 8:
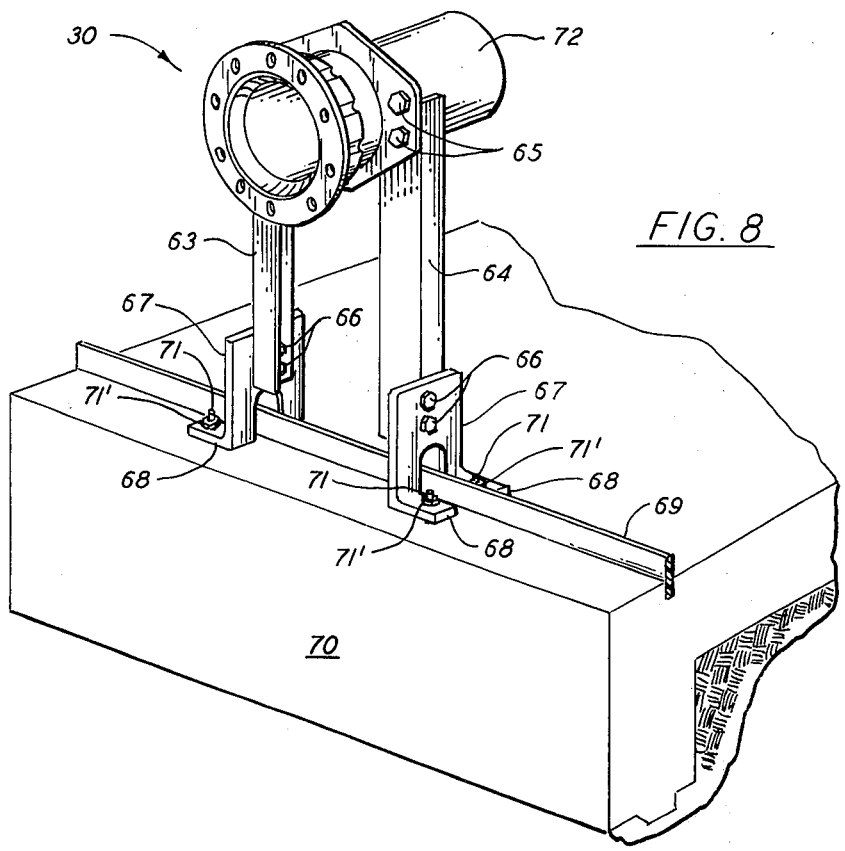
FIG. 8 is a perspective view of a wall sleeve assembly mounted on a free-standing support structure.

As mentioned previously, an important feature of the present invention is a free-standing support structure for wall sleeve assemblies that incorporate the disclosed threaded bell fitting. Referring to FIG. 8, this support structure includes a pair of angle columns 63 and 64 that are attached at their upper ends to the mounting tabs or equivalent mounting means of a bell fitting 30 by means of bolts 65. The lower ends of support columns 63 and 64 are attached by bolts 66 to the upright legs of pedestal brackets 67.

Brackets 67 have split or bifurcated feet 68 which permit the bracket to straddle a plastic water stop barrier 69 that is set into a poured concrete foundation slab 70 of a water or sewage treatment tank, for example. Such water stop barriers are conventionally employed at the joints between separately poured foundation slab and walls of a concrete tank and are normally placed near the centerline of the wall.

The bracket feet of the support structure are secured to the foundation by preplaced studs 71 and nuts 71' on either side of the water top barrier to give a stable footing to the support structure without breaching the barrier.

In addition to the bell fitting 30, the sleeve assembly illustrated in FIG. 8 includes a short section of pipe 72 that has been threaded at one end and screwed into the threaded end of the bell fitting. This type of sleeve is often used in tank walls where there is no additional pipe to be attached on the inside of the tank. The overall length of the sleeve is equal to the wall thickness, thereby allowing the sleeve to be closed in by the wall forms without the need to cut any holes in the form.

The advantages of the support structure shown in FIG. 8 are apparent from the drawing. All wall sleeve assemblies for an entire wall section can be properly located by these free-standing supports merely by cutting the angle columns to proper length and by preinstalling the foundation studs in forms before the slab is poured. Since the mounting means of the bell fitting are located at the small diameter end, they are as close as possible to the center of gravity of the sleeve assembly. This minimizes the moment forces acting on the upper ends of the angle columns, thereby reducing their tendency to buckle.

At the same time, locating the mounting means on the bell fitting as far as possible from the bolting flange keeps the support structure out of the way of the formwork that is subsequently erected. Once the wall sleeves for a tank have all been set in place on individual free-standing support structures, reinforcing steel can be installed without concern that there will be interference problems later on.

Figure 9:
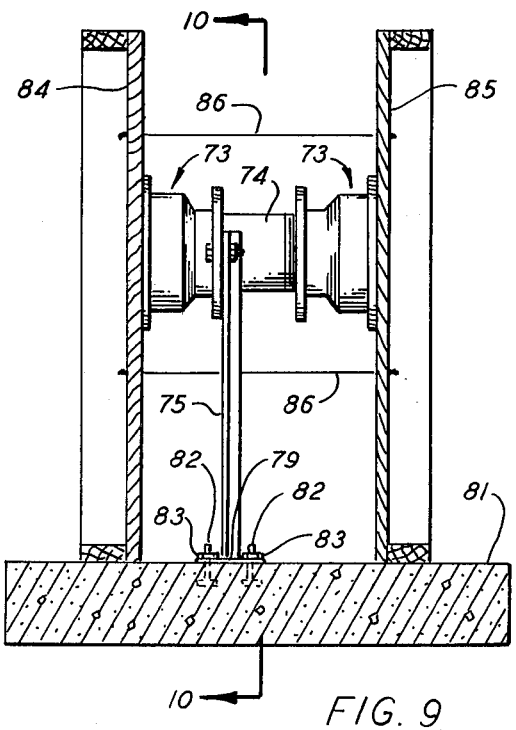
FIG. 9 is a side view of a wall sleeve assembly employing two female-threaded bell ends according to the invention and an intermediate male-threaded pipe nipple.
Figure 10:
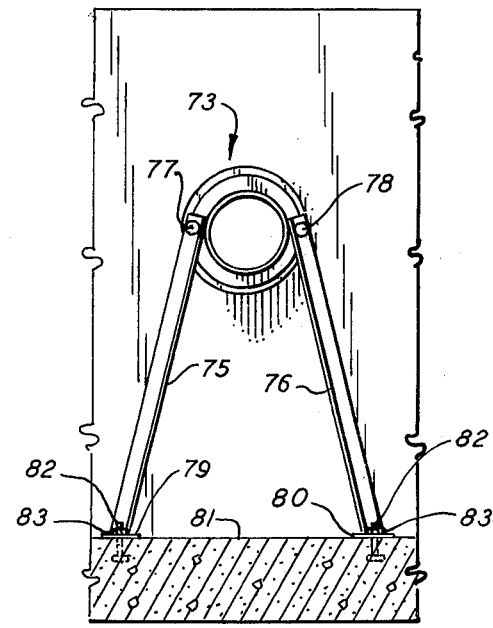
FIG. 10 is an end section view of the wall sleeve assembly of FIG. 9 taken along line 10—10.

FIGS. 9 and 10 illustrate an alternative support structure for a wall sleeve assembly, as well as the manner of installing the formwork for a poured concrete wall around the sleeve assembly. The sleeve assembly of FIGS. 9 and 10 is made up of two identical bell fittings 73 that have been screwed onto the opposite ends of a short pipe section 74. The construction of bell fittings 73 is substantially the same as shown in FIGS. 2 and 3 except that the mounting means includes only one mounting hole in each side of the water stop flange instead of two.

The sleeve assembly of FIGS. 9 and 10 is supported by two angle iron legs 75 and 76 having their upper ends attached to the mounting tabs of one of the bell fittings by bolts 77 and 78, respectively. The lower ends of legs 75 and 76 terminate in foundation pads 79 and 80, respectively, that are secured to a concrete foundation 81 by means of studs 82 and nuts 83. In this way, the wall fitting assembly is positioned and supported before any framework is put in place and while there is free access all around. After the fitting assembly has been mounted on the support legs, wall formwork 84 and 85 are erected at each end of the fitting. The formwork is held in place by conventional form ties 86 spaced around the fitting assembly.

The side view of FIG. 9, in particular, illustrates the ease and simplicity of erecting the formwork about the wall sleeve on its free-standing support legs. For simplicity, no reinforcing bars are shown in this drawing, but it will be understood that such would normally be placed before erecting the forms. No additional form reinforcement is needed to support the wall sleeve cantilevered from one form by bolts through the bolting flange until the other form can be placed, as is common in current practice. No holes need to be cut or drilled through the forms, except for the usual cross ties. Essentially, the forms are structurally independent from the wall sleeve support, thereby simplifying not only form erection but also form disassembly after the concrete wall has hardened.

I claim:

1. A bell fitting for iron pipe of a preselected standard nominal diameter and particularly adapted for use as a concrete wall penetration fitting, the bell fitting comprising:
   an annular member having
      a first end having a threaded inside surface adapted to fit an externally threaded pipe of said preselected standard nominal diameter, and said first end including an integrally formed external, circumferential continuous blind flange adapted to serve as a water stop when the fitting is incorporated into a concrete wall;
      a second end formed with a bell shape having an inside diameter larger than the inside diameter of said first end and an integral external circumferential bolting flange; and
      mounting means comprising at least two circumferentially spaced tabs integrally formed on and extending outwardly from the surface of the fitting adjacent said first end, said mounting means being adapted to permit support of the bell fitting at said first end independently of said bolting flange on said second end.

2. A bell fitting for iron pipe according to claim 1 wherein each of said mounting lugs is drilled and tapped for a threaded mounting stud.

3. A bell fitting for iron pipe according to claim 1 wherein the mounting means on said first end comprises two circumferentially spaced integral mounting tabs extending radially outward from the periphery of the blind flange, at least one mounting hole being located in each of said mounting tabs.

4. A bell fitting for iron pipe according to claim 3 wherein the mounting means further comprises integral reinforcing lugs extending outwardly from the surface of the bell fitting contiguous to the blind flange on said first end in axial alignment with at least one mounting hole in each mounting tab.

5. A bell fitting for iron pipe according to claim 4 wherein the mounting holes in axial alignment with the reinforcing lugs are threaded to receive mounting studs.

6. A bell fitting for iron pipe according to claim 1 wherein the bolting flange has a plurality of angularly spaced bolt holes, and the fitting further comprises a plurality of spaced recesses around the periphery adjacent to the bolting flange and adapted to provide clearance for nuts threaded onto bolts inserted through said bolt holes.

7. A bell fitting for iron pipe according to claim 1 further comprising a support structure for said fitting, said support structure comprising:
   an elongated angle column having one end fastened to the mounting means of the bell fitting and
   a pedestal bracket having a leg portion fastened to the other end of the angle column and a bifurcated foot portion extending substantially normal to the leg portion, the foot portion being adapted to be secured to studs on a concrete foundation with the bifurcation straddling a water stop barrier strip set into said foundation.

8. A mechanically secured mechanical joint for pipe comprising:
   first and second mechanical joint bell fittings, each having a first end with a threaded inside surface adapted to fit an externally threaded pipe of preselected nominal diameter and a second end formed with a bell shape and having an integral external circumferential continuous bolting flange surrounding the mouth of the bell, the bolting flanges of the first and second bell fittings each having a plurality of mating circumferentially spaced bolt holes therethrough, and the exterior surfaces of the fittings having a recess aligned with each bolt hole to provide clearance for rotating a nut on a bolt extending through the bolt hole;
   a section of plain pipe of said preselected nominal diameter having one end inserted into the second end of the first bell fitting and an opposite end inserted into the second end of the second bell fitting;
   first and second annular flexible gaskets encircling the one and the other ends of the plain pipe section, respectively, within the bell ends of the first and second bell fittings;
   a cylindrical annular gland ring having an internal diameter larger than the external diameter of the plain pipe section and loosely encircling the plain pipe section between the first and second gaskets, with one end of the gland ring bearing against the first gasket and the other end of the gland ring bearing against the second gasket;
   tension bolts extending through corresponding bolt holes in the bolting flanges of the first and second bell fittings; and
   a nut threaded on one end of each tension bolt and drawn up against the adjacent bolting flange to maintain a predetermined pressure exerted by the ends of the gland ring against the first and second gaskets which maintains said gaskets in sealing engagement with said plain pipe section and said bell ends.

* * * * *

UNITED STATES PATENT AND TRADEMARK OFFICE
CERTIFICATE OF CORRECTION

PATENT NO. : 4,076,281
DATED : February 28, 1978
INVENTOR(S) : Samuel H. Davis

It is certified that error appears in the above–identified patent and that said Letters Patent are hereby corrected as shown below:

Column 2, line 34: change "weight" to --weigh--.

Column 4, line 6: change "or" to --of--.

Column 7, line 11: change "the" to --that--.

Column 8, line 17: change "top" to --stop--.

*Signed and Sealed this*

*Fifteenth* Day of *January 1980*

[SEAL]

*Attest:*

SIDNEY A. DIAMOND

*Attesting Officer*

*Commissioner of Patents and Trademarks*